F. CHALOUD, Jr.
SUPPLEMENTAL BOTTOM FOR POTS AND PANS.
APPLICATION FILED JUNE 19, 1907.

1,021,133.  Patented Mar. 26, 1912.

Witnesses
J. C. Simpson
M. J. Miller

Inventor
Frank Chaloud, Jr.
By Chandler & Chandler
Attorneys

UNITED STATES PATENT OFFICE.

FRANK CHALOUD, JR., OF BROWNLEE, NEBRASKA.

SUPPLEMENTAL BOTTOM FOR POTS AND PANS.

1,021,133.           Specification of Letters Patent.     Patented Mar. 26, 1912.

Application filed June 19, 1907. Serial No. 379,780.

*To all whom it may concern:*

Be it known that I, FRANK CHALOUD, Jr., a citizen of the United States, residing at Brownlee, in the county of Cherry, State of Nebraska, have invented certain new and useful Improvements in Supplemental Bottoms for Pots and Pans; and I do hereby declare the following to be a full, clear, and exact description of the invention, such as will enable others skilled in the art to which it appertains to make and use the same.

This invention has relation to culinary boilers or steamers, and has for its object the provision of a foraminous disk or grate for the inside of boilers or steamers that will serve to keep meats or vegetables from resting directly on the bottom of the kettle or boiler from being scorched or burned in any degree by direct contact therewith.

The nature of the invention is fully and clearly ascertainable from the device portrayed in the annexed drawings, forming a part of this specification, in view of which it will first be described with respect to its construction and mode of employment, and then be pointed out in the subjoined claim.

Figure 1:
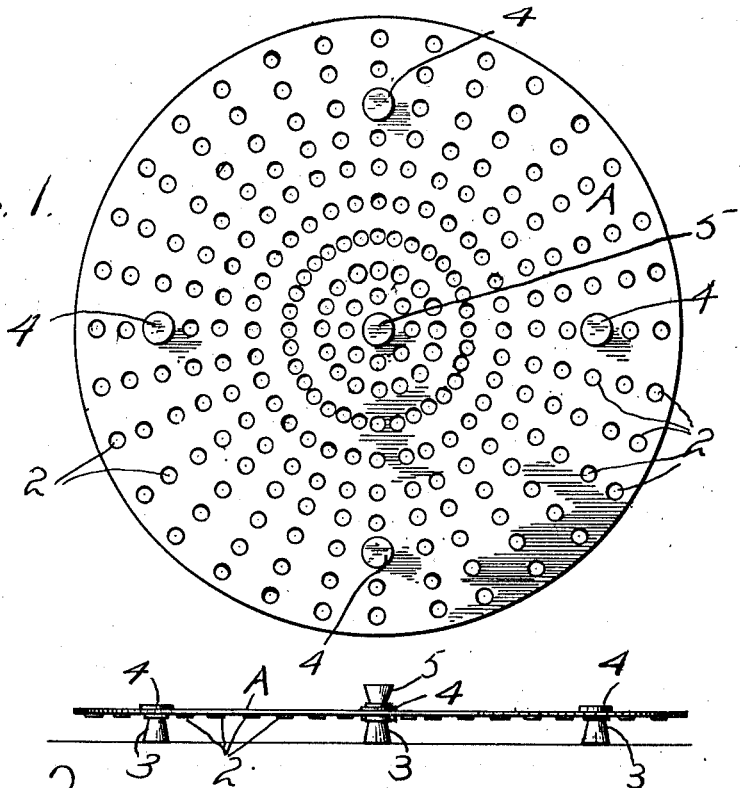
Figures 2, 3:
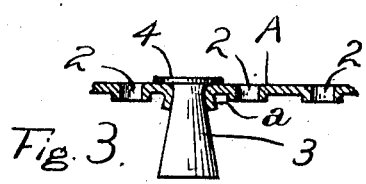
Figure 4:
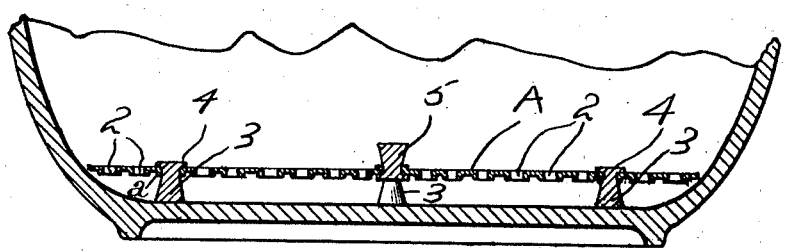

Of the said drawings—Figure 1 is a plan of a form of means embodying the invention. Fig. 2 is a side view. Fig. 3 is a detail sectional view, showing clearly the manner of securing the supporting studs in the plate. Fig. 4 is a vertical sectional view showing the invention in place on a bottom of a pot, only a portion of the latter being represented.

Similar numerals of reference designate similar parts or features, as the case may be, wherever they occur.

In the drawing the letter A designates a disk of sheet metal made foraminous by punching a plurality of holes 2 therethrough in such manner that one will be surrounded by an upstanding collar located preferably centrally of the disk upon its upper face and the remainder by depending collars upon the under side of the disk, the said holes being for general purposes as numerous as possible without weakening the disk.

3 designates studs or short posts secured in the holes in the disks so as to project from the under side thereof to support the disk in the pot or kettle in spaced relationship to the bottom, so that the meat or vegetables being cooked will not rest directly on the bottom of the pot, and become scorched or burned as often happens, whereby the cooking is not only rendered imperfect and unsatisfactory, but the housewife or kitchen maid is given a great deal of trouble to clean the pot after cooking.

Of course as great or small a number of studs 3 may be provided as may be considered desirable. Again, it is obvious that the disk may be formed of other material than sheet metal having holes punched through it, so long as rendered foraminous and thin, and provided with the studs 3. If necessary the disk can be of other shape than round in outline, this feature not being of essence of the invention. The studs in the holes in the plate, however are of materiality in the improvement, the office of which are to maintain the plate in spaced relationship to the real bottom of the pot or kettle.

As a matter of further and specific improvement, and as clearly shown in Fig. 3, the collars *a* that surround the studs 3 which constitute the legs are projected a greater distance beyond the lower face of the disk than those formed in the remainder thereof and are of truncated conical form. The said studs 3 are also of truncated conical form with their smaller ends fitted in said truncated conical collars and then up set to provide the heads 4, which bear on the upper side of the disk. This construction of the disk with the truncated conical collars surrounding the stud holes and of the studs of truncated conical form with their smaller ends in said collars secures an extended circumferential bearing for the said studs and also effects a perfectly tight and rigid connection between the studs and the disk as the truncated conical form of said studs and collars prevents the studs from working in one direction and the heads of the studs prevent them from working in the opposite direction.

The supporting studs 3 may be maintained in the holes 2 by enlarging their bases, so that they shall taper outward and upsetting their upper ends as heads 4. The central stud 5, located in the upwardly extending central collar extends above the plane of the plate as shown, to form a means for engaging the plate to lift it from position in the pot.

It will be observed that the annular collars surrounding the holes on the under side of the plate contribute greatly to the strength and wearing qualities thereof by preventing cracks from running from hole to hole.

What is claimed is—

The combination in a cooking utensil, with a disk formed with a central perforation, and a plurality of surrounding perforations, truncated conical collars struck downwardly from the disk around certain of the surrounding perforations, depending studs of truncated conical formation having their smaller ends fitted in the said collars and held therein against lateral movement by the same, heads formed upon the studs by flattening the smaller ends thereof to engage the upper side of the disk opposite the one from which the collars project, the said heads preventing the studs from working in one direction and the tapered formation of the studs and collars preventing the studs from working in the opposite direction, whereby the studs are held rigidly in spaced relation, said depending studs constituting supports for the disk, a truncated collar struck upwardly from the central perforation, an upwardly extending stud of truncated conical formation having its smaller end located in the upwardly extending collar, and a head formed upon this stud and engaging the lower face of the disk, said last mentioned stud constituting a finger grip, substantially as and for the purposes set forth.

In testimony whereof, I affix my signature, in presence of two witnesses.

FRANK CHALOUD, Jr.

Witnesses:
Jas. W. McDonald,
J. R. Lee.